March 27, 1945.  B. A. WITTKUHNS  2,372,185
DRIFT COMPENSATOR FOR AIRCRAFT
Filed Oct. 27, 1938  3 Sheets-Sheet 1

INVENTOR
BRUNO A. WITTKUHNS
BY
Herbert H. Thompson
HIS ATTORNEY

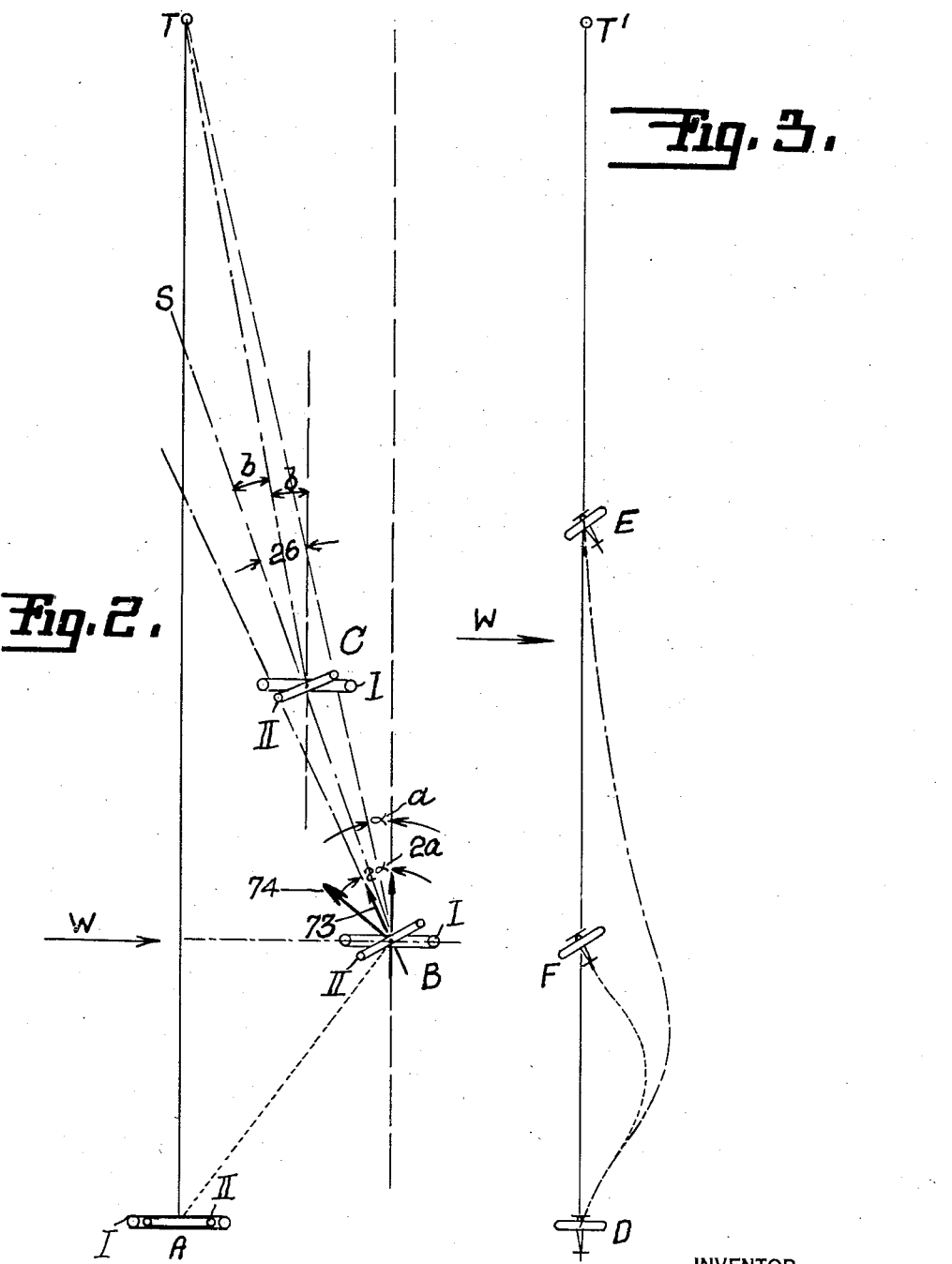

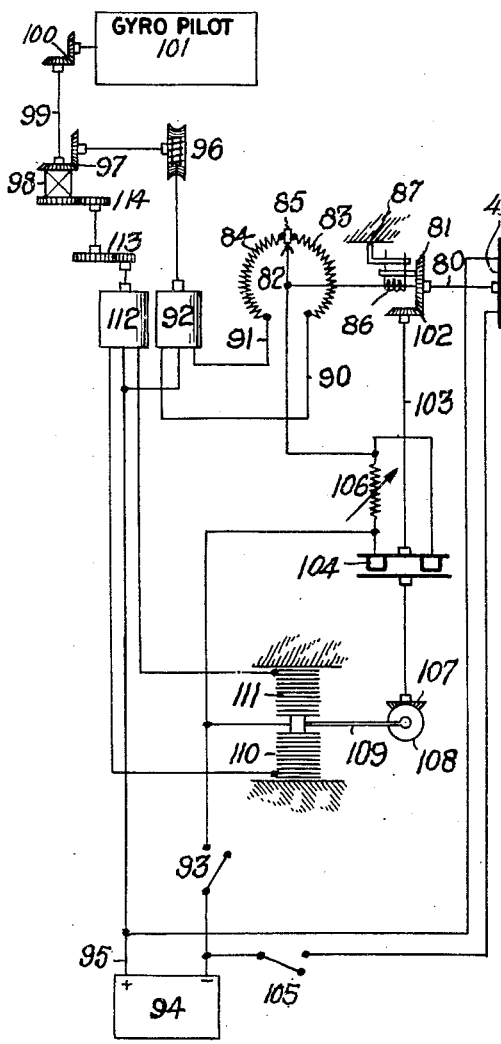
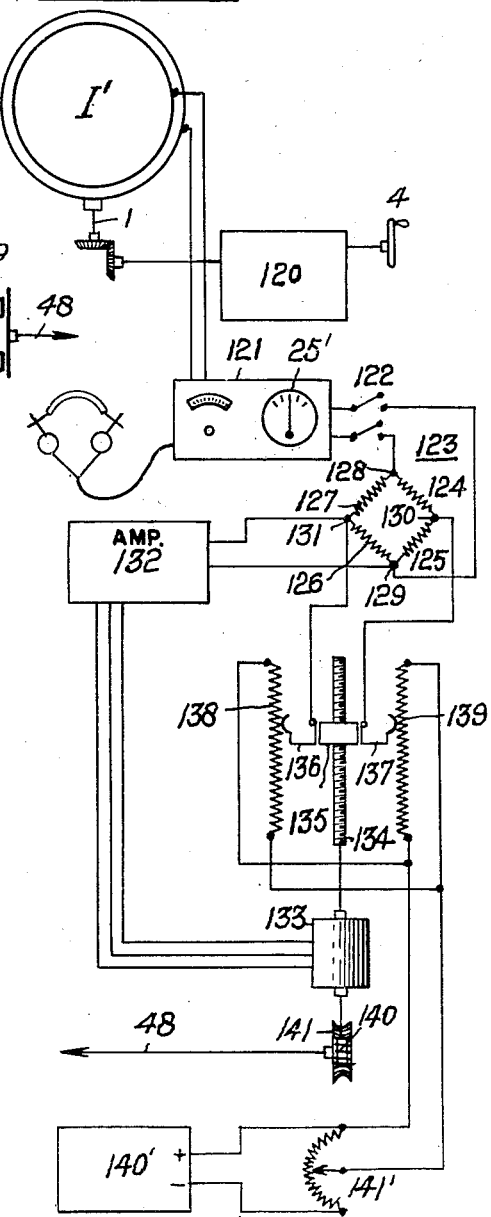

Patented Mar. 27, 1945

2,372,185

UNITED STATES PATENT OFFICE 2,372,185

DRIFT COMPENSATOR FOR AIRCRAFT

Bruno A. Wittkuhns, Summit, N. J., assignor to Sperry Gyroscope Company, Inc., Brooklyn, N. Y., a corporation of New York Application October 27, 1938, Serial No. 237,197

27 Claims. (Cl. 172—282)

This invention relates to navigational devices used particularly on aircraft for the purpose of directing the craft in a straight line toward a point where a radio transmitter is located.

Several devices of this kind, which attempt to steer the plane in a straight line between two points have been proposed, but all have certain shortcomings which prevent the plane from reaching and staying on a straight line track between the two points. Either the device will cause the airplane to hunt with more or less wide amplitude across that straight line, or the approach to the transmitting station is made in a straight line forming an angle with the original straight line, so that if obstacles of dangerous nature, such as, for instance, church spires or mountains are located closely adjacent the original projected course, the airplane is in danger of collision.

The present invention overcomes the difficulties encountered by the previous devices by combining an absolute direction indicator with a relative direction indicator in a novel combination in such a way that a drifting airplane is turned back to and kept on its original course by the shortest possible path. A directional gyroscope or similar device, or a radio direction finder loop stabilized in azimuth may be used as the absolute direction indicator, while another radio direction finder loop, normally kept trained on the transmitting station, may serve the purpose of determining the relative direction of flight with respect to the station.

Another object of this invention is to provide a means by which the allowable maximum aberration of the ship from the course due to drift may be adjusted at will. This has the advantage that the pilot is enabled to adapt this navigating device to the strength of the cross wind which he may encounter on his course, because it is obvious that the plane will be driven off the course more with a strong cross wind than with a relatively weak cross wind.

Another object of the invention is to perfect and improve on the type of Homing auto pilot for aircraft shown in the prior application of Bert G. Carlson, Serial No. 32,193, filed July 19, 1935, assigned to the assignee of the applicant.

In the accompanying drawings,

Fig. 2 shows a diagrammatic analysis of the functioning of the device.

Fig. 3 shows the effect of the adjustment for cross wind.

Fig. 4 shows another preferred form of the invention.

Fig. 5 shows a preferred simplified form of the apparatus employed.

Figure 1:
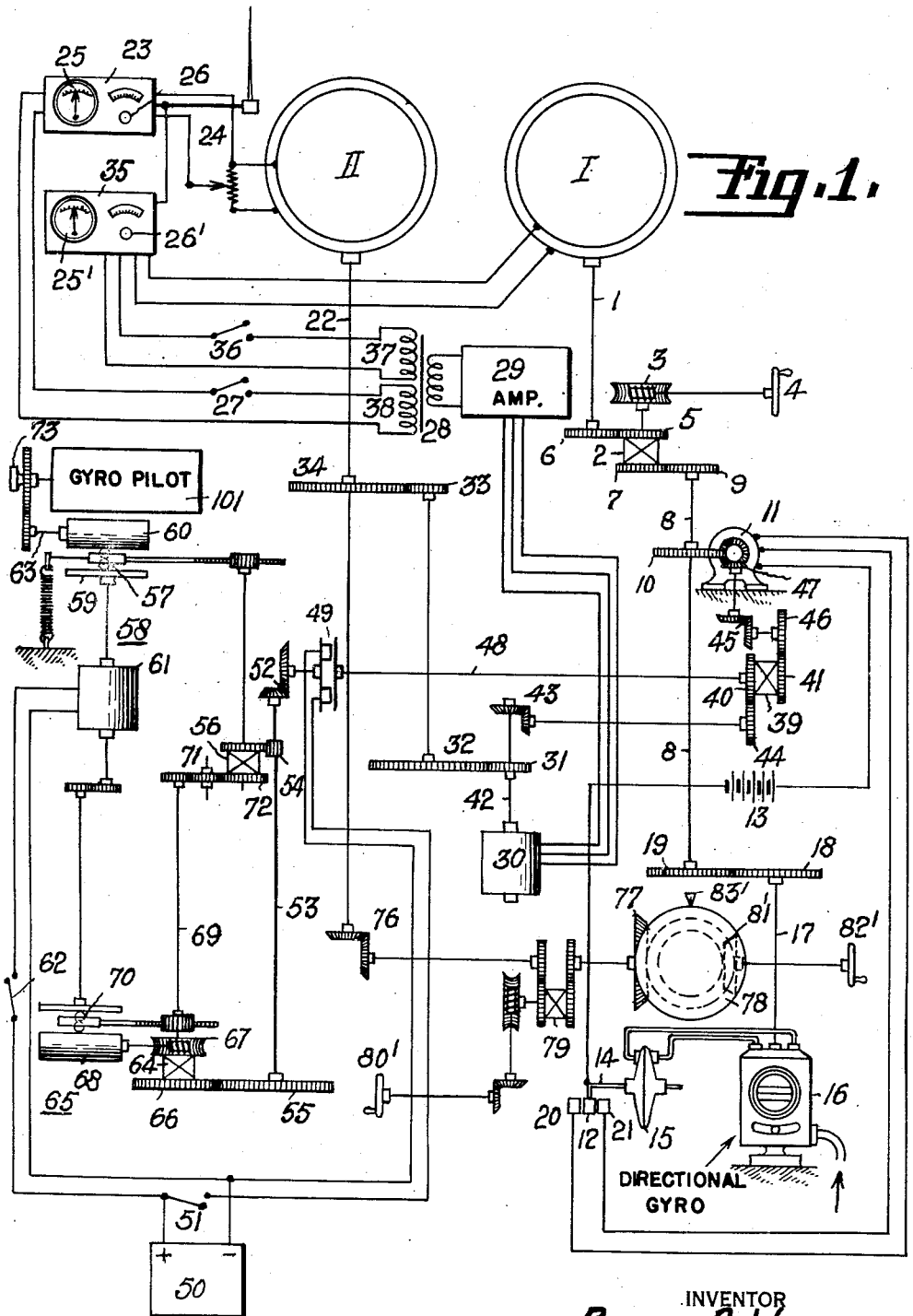
Fig. 1 shows a schematic diagram of the navigational device.

In Fig. 1, I and II are two radio direction finder loops as commonly used on radio compasses and similar devices. Loop I is mounted on a shaft 1 for rotation around the vertical axis. Shaft 1 is mounted on the ship and its rotation is controlled by the three-arm differential 2. The center arm of this differential is controlled by a worm and worm gear connection 3 from the handwheel 4, which serves the purpose of setting the loop I to any desired direction. The second arm 5 of the differential is geared to the shaft 1 by means of gear 6, while the third arm 7 of the differential is geared to the shaft 8 by means of gear 9. Shaft 8 is driven by a worm and worm gear connection 10 from a motor 11 which, in turn, is controlled by an electrical contact 12. A battery 13 is shown as the preferred means to energize motor 11. The contact 12 is controlled from a pin 14 which is positioned by a pressure sensitive diaphragm 15 subjected to differential pressures created by the pneumatic pick-off devices contained in the housing of a directional gyroscope 16. These pneumatic pick-off devices are well known in the art and further description of such devices as well as of the directional gyroscope and automatic gyro-pilot may be omitted from this specification, reference being had to the aforesaid prior application of Bert G. Carlson for these and other details. The pick-off device is associated with a repeat-back connection 17 turned by gears 18 and 19 from shaft 8. The function of this arrangement is as follows.

If the heading of the craft deviates from its first assumed position with respect to the directional gyroscope, a differential pressure will deflect the diaphragm 15 to one side or the other and contact 12 will establish an electric circuit through either contact 20 or 21, thereby driving motor 11 in one direction or the other, as the case may be, but in such a way as to cause the repeat-back shaft 17 to re-establish balanced conditions on the diaphragm 15 as soon as gear 18 has turned through the same angular amount as the directional gyroscope. As the center arm of the differential 2 is locked against rotation by worm and worm gear connection 3, rotation of the motor 11 will cause the loop I to follow the gear 18 and thereby cause the loop to assume a position in which its axis is always in positional agreement with the directional gyroscope 16. Once, therefore, the directional gyroscope and the motor 11 are operatively engaged, loop I will be stabilized in space and its axis will remain parallel to itself, no matter how the course or heading of the ship may be changed. It is understood, however, that instead of a separate directional gyroscope as shown, the similar directional gyroscope contained in the automatic pilot 101 may be used by providing a second pneumatic pick-off device on same, if desired.

Loop II is essentially of a structure as used in automatic radio direction finders and as described more in detail in the copending application of Francis L. Moseley, Ser. No. 170,308, for Radio compass navigation apparatus, filed October 22, 1937, now U. S. Patent No. 2,257,757, issued October 7, 1941. The arrangement of this loop is such that a follow-up motor controls its position in space and causes the loop to rotate as long as it receives a signal. The provision of a non-directional antenna whose output is combined with that of the loop eliminates ambiguity due to the symmetrical pattern of the loop alone as explained in application Serial No. 170,308. The loop therefore automatically will point its axis to a transmitting station if the loop receiver is tuned to that station and if the follow-up motor is operatively connected to a suitable amplifier controlled by the loop receiver. Details of this construction which bear no direct relation to this application have been omitted, reference being had to the above mentioned prior application. The loop is mounted on a shaft 22 for rotation around its vertical axis. A signal received by the loop is introduced into the loop receiver 23 over a volume control potentiometer 24. The loop receiver has a zero signal or right-left indicator 25 and a tuning knob 26, so that it can be tuned to any desired radio frequency. If the loop is turned, the zero indicator 25 will show the exact point at which the loop passes through the zero signal position. The output of the receiver 23 is passed over a switch 27 into the winding 38 of the input transformer 28, and from there into an amplifier 29, where the loop signal is suitably transformed and amplified to control a reversible follow-up motor 30 which, in turn, through gears 31, 32 and 33, 34, positions the loop II with respect to the straight line to the particular transmitting station to which the loop is tuned. Loop II, therefore, considered by itself (e. g., if the signal from loop I were non-existent), when it is tuned to the particular transmitting station at the far end of the projected course, would automatically point its axis toward that station and keep it pointed there regardless of any change of course of the ship, so that considered alone, loop II operates somewhat as an automatically oriented direction finder.

A second loop receiver 35, which is preferably identical to the receiver 23, is connected to loop I. It is understood that both loops I and II have the same electrical characteristics. The output of receiver 35 over switch 36 is fed into winding 37 of input transformer 28, where it is combined with the signal from receiver 23 so that amplifier 29 receives signals from both loops. The phase of the signals is so arranged that zero input to the amplifier 29 is obtained only if there is zero signal in both loops, or if their respective signals are equal and of opposite phase, so that they neutralize each other in the input transformer 28. This is only true, naturally, if both loops are tuned to the frequency of the same transmitting station. Therefore, if both switches 36 and 27 are closed loop I will maintain its axis in a fixed direction in space, while loop II will react to the sum of the signals in both loops and turn around its axis until its own signal is equal and opposite to that of loop I, provided potentiometer 24 is set so that the signal received by receivers 23 and 35 will be the same when the two loops are parallel, which setting of potentiometer 24 is assumed for the present. The ultimate position, at which loop II will come to rest will be with its axis at an angle to the straight line from the loop to the transmitter, this angle having a value equal and opposite to the angle between the axis of loop I and said straight line. The bisector of the angle between the two loops coincides with the direction of reception of the waves from the distant transmitter.

The angle between the two loops will have twice the value of each of the separate loop angles relative to the direction of wave reception, and is measured by differential 39. This differential is geared to the respective shafts of both the motors 30 and 11, which are supposed to run with equal speeds when both loops are turning simultaneously in the same direction, at equal speeds. Arm 40 of the differential is driven from shaft 42 of motor 30 through bevel gears 43 and gear 44 in one direction, while arm 41 is driven from the shaft of motor 11 by bevel gears 47, 45 and gear 46 in opposite direction. If both motors rotate at equal speed, the third arm 48 of the differential will stand still, but it will rotate in one direction or the other, as the case may be, if one motor stands still or rotates at a different speed. Shaft 48 is thus positioned proportionally to the angle between the two loops. Shaft 48 is connected to one part of a magnetically or otherwise engageable clutch 49, shown as energized by a battery or other current supply 50 through a switch 51. The driven part of the clutch, through bevel gears 52 drives a shaft 53 carrying a pinion 54 and a gear 55. Pinion 54, through a differential 56, causes the ball carriage 57 of a variable speed integrator 58 to move from its neutral position on the rotating disc 59, whereby roller 60 is caused to rotate at a speed proportional to the lateral displacement of the carriage. As this displacement is proportional to the angular difference between the two loops, the roller will travel rotationally an amount proportional to the time integral of said displacement. The time element is introduced by constant speed motor 61, energized from battery 59 through switch 62, and driving disc 59. Roller 60 drives a shaft 63, which in turn is connected to the course changing device controlled by knob 73 on the automatic pilot 101, with which the plane is supposed to be equipped, but which is not described in this specification, as it is well known to those skilled in the art and may be of any of several known designs. Consequently, the airplane turns and continues to turn as long as roller 60 turns, at a rate determined by the angle between the loops I and II.

Gear 55 turns only as long as there is a speed difference between motors 30 and 11, such as occurs when the craft veers from the course. Gear 55 is connected through a differential 64 to another variable speed drive 65, energized by motor 61, but connected as a differentiating device. One arm 66 of differential 64 is driven by gear 55, another arm 67 formed by worm gear 67, is driven by roller 68, so that the third arm drives a shaft 69 to shift the carriage 70 until the speed of gear 66 is matched by worm wheel 67. The lateral displacement of carriage 70 then is directly proportional to the angular speed of gear 55 or, in other words, measures the rate of change of the angle between the loops. Shaft 69 transmits this value, the relative ratio of which can be selected by choosing appropriate gear ratios, over an idler gear train 71 to the second arm 72 of differential 56 so that the lateral displacement of carriage 57 now is proportional to the sum of the angular displacement between the loops and the first derivative thereof.

The function of the devices hereinbefore described is best explained by means of Fig. 2. A is the position from which the airplane starts out on its flight to the transmitting station T, which it is desired to reach in a straight line. A cross wind W is blowing across the proposed path of the plane and would normally result in a side drift and a parabolic approach. Shown at A are two loops I and II, which in this case are shown with different diameters for simplicity of illustration. Switches 27, 36 and 51 are open, 62 closed. As soon as the airplane leaves the ground, loop I is tuned to the wave length of the transmitting station T by means of knob 26', using the meter 25' or a telephone, not shown, as an indication for resonance. The loop is then set on the station by means of handwheel 4, which is turned until the zero signal position of the loop has been reached. Now the pick-off at the directional gyro 16 and the motor 11 are energized so as to stabilize loop I in space, as described before. Immediately thereafter, loop II is turned to the wave length of the same transmitting station T in the manner described for loop I, and then switch 27 is closed, whereby the loop signal is now received by the amplifier 29 and there utilized to control the follow-up motor 30. This motor will now operate until the signal in loop II has completely disappeared, at which time the motor becomes stationary, and the axis of loop II points at T. Both loops now are parallel.

The next step is the closing of switches 51 and 36 energizing the clutch 49 so that now the automatic pilot is operatively connected to the motor 30 and to both loops I and II.

It it is assumed that these functions have been performed quickly before the cross wind W has had any appreciable effect on the plane, it will be evident that as the plane drifts off sideways from its selected course A—T, the loop I will start to receive signals from the station T because of the parallel displacement of its axis from line A—T, while loop II will also receive the same signal, as long as it is not turned by motor 30.

If it is further assumed that the plane has reached a position B, the following conditions will prevail. The loop I is still stabilized in space and receives a signal proportional to the angle $a$. Loop II adds its signal to that of loop I causing motor 30 to turn loop II in a direction to reduce the combined signals and will have to turn through an angle $2a$ before its own signal will become equal and opposite to the signal received in loop I. It therefore will be pointed in the direction of arrow 73. By turning through this angle $2a$, shaft 48 has displaced the ball carriage 57 of the variable speed drive 58 a proportional amount and the roller 60, through shaft 63, causes continuous slow turning of the airplane. While the angle $2a$ was changing its value, ball carriage 70 assumed a position proportional to the rate of change of this angle, thereby further displacing carriage 57 in the same direction. Due to the turning of the plane, both loops together will now rotate with respect to the craft without turning shaft 48 however, which remains stationary as long as both motors rotate at equal speed. The airplane finally reaches a point where it is actually proceeding along the line BT, at which time shaft 53 stops, causing carriage 70 to return to neutral and thereby decreasing the displacement of carriage 57 and the rate of turn of the ship. But carriage 57 is still displaced according to the angle $2a$; therefore the ship keeps turning, though at a lower rate. This results in a decrease in the signal in loop I and an increase in the signal in loop II, so that motor 30 will move to steadily decrease the angle $2a$. This results in a displacement of carriage 70 in the opposite sense, thereby further decreasing the still present displacement of carriage 57, or reducing it to zero, depending upon the gear ratios used, or, in other words, upon the mechanical value of the displacement of carriage 70 per unit of speed. It therefore follows, that the rate of turn of the plane is reduced or brought to zero. This means that the plane now may be proceeding along line BS, continuously reducing the angle $2a$ which becomes $2b$ when the ship reaches position C. This continued reduction of the angle $2b$ causes further shift in the last described direction of carriage 57, to the other side of the center of the disc 59, reversing the direction of turn of the plane, whereby a gradual approach to the line AT is obtained. The plane therefore arrives ultimately at a position E, Fig. 3, after proceeding along the broken line path from D to E. It must arrive on the straight line DT', because only there can the condition be fulfilled, where both loops receive zero signal with zero angular displacement. It is obvious, therefore, that in this manner the airplane will finally proceed along the straight line DT', attaining this course in an asymptotic manner.

Fig. 4 shows a modification of the navigational instrument in which similar results are obtained by electrical means in a simplified manner. Inasmuch as the primary elements, namely, the loops I and II of the receivers 23 and 25, the amplifier 29, and the directional gyro and its accessories are identical with Fig. 1, only that part is shown in Fig. 4 which differs. Starting with shaft 48 which is angularly displaced in accordance with the angular difference of the position of loops I and II, the same magnetic clutch 49 as before is employed to connect the course changing apparatus to the loops. The driven part of the clutch 49 is mounted on a shaft 80 and carries a bevel gear 81 as well as the movable arm 82 of a two part rheostat 83, 84, the two windings of which are separated by an insulator 85. Normally the arm 82 rests on the insulator 85. A rotary return spring 86 is so arranged between a fixed member 87 and a pin connected to gear 81, that it will return the shaft 80 to its normal position as soon as clutch 49 is disengaged. Electrically connected to the rheostat 83, 84 are two conductors 90 and 91 adapted to energize the reversible motor 92 in one direction or the other depending upon the direction of rotation of shaft 80. The arm 82 is connected to a battery 94 over a switch 93. The positive terminal 95 of the battery is connected to the third terminal of motor 92. If now clutch 49 is energized and shaft 48 turns, the motor 92 will run in one direction or the other, as the case may be, and thereby through worm and worm gear 96, and by means of bevel gears 97 turn one arm of differential 98. The output of the differential through shaft 99 and bevels 100 is introduced into the course changing device of the gyro pilot 101. As long as shaft 99 is kept turning the plane will turn at the same rate, provided, however, that the rate of turn of shaft 99 does not exceed the maximum rate of turn of the airplane. The plane therefore will keep turning as long as arm 82 remains displaced from the segment 85, and the faster, the larger its displacement.

Bevel gear 81 drives a bevel pinion 102, mounted on shaft 103, which carries one part of a magnetic clutch 104. This magnetic clutch is energized like clutch 49, from battery 94, but in series with the reversing windings of motor 92, and its holding power is adjustable by rheostat 106, so that the torque of this clutch rises with rising displacement of brush 82 and also can be fixed in its maximum amount so as to cause the clutch to slide at a predetermined maximum torque. This clutch, when engaged, drives bevel gears 107 and 108. Gear 108 carries on an insulated bushing, an arm 109 which is connected over switch 93 to the battery. The free end of the arm 109 is located between two carbon piles, 110 and 111, which in turn are connected to the rate motor 112 in such a way as to normally allow equal amounts of current to pass into the reversing windings of said motor. If shaft 103 turns while the clutch is engaged, the arm 109 will compress one carbon pile and releases the other one, thereby decreasing the resistance in one pile and increasing the resistance in the other one. The motor 112, therefore, will turn in one direction or the other, as the case may be, and with a speed depending upon the amount of torque exercised by the arm 109 and on the speed with which shaft 103 turns. This will result in causing motor 112 to run substantially in proportion to the rate of speed with which shaft 48 turns. The motion of the motor 112 through gears 113 and 114 is transmitted to the second arm of differential 98 where its motion is added to the motion caused by motor 92, resulting in an increased rate of turn of the airplane.

The function of the above described arrangement is as follows: after the loops I and II have been tuned and set on the transmitting station T, clutch 49 is energized by means of switch 105. If the airplane drifts, shaft 48 will start to rotate and first start motor 92 by means of the arm 82 and rheostat 83 and 84, causing the airplane to slowly turn in a direction to reduce drift. At the same time, clutch 104 has been engaged by arm 82, but with weak torque due to the resistance of 83 or 84 in series with its windings. It will cause arm 109 to compress one of the carbon piles slightly, and then slip. The compression of one carbon pile starts motor 112 to turn over slowly, thereby increasing the rotary input into the gyro-pilot, so that the plane turns faster. As long as shaft 48 rotates in a direction indicating an increasing angular deflection between loops I and II, clutch 104, due to the decrease of series resistance caused by motion of arm 82, increases its torque, thereby compressing the carbon pile more and more, thereby causing motor 112 to rotate faster and faster, while also motor 92 increases its speed. Both motors therefore will increase the rate of turn of the airplane more and more, the faster it drifts. The result of the turning of the airplane is finally a gradual decrease of the rate of turn of shaft 48 until this rate becomes zero, meanwhile slowing down the speed of motor 112. When shafts 48 and 103 stop, motor 112 will also stop because equal pressure will exist on both carbon piles 110 and 111. However, motor 92 keeps on turning thereby causing the airplane to continue turning at a rate proportional to the angular displacement of arm 82, which is proportional to that between the loops. It is obvious that the plane must now be headed in a direction toward the line AT of Fig. 2 and approximately in the direction of the arrow 73. Due to the continued turn, it will finally head in the direction of arrow 74 and rapidly approach the line AT thereby causing a decrease of the angular displacement between the two loops. Consequently, the shaft 48 now reverses its direction of rotation so that, while motor 92 still keeps the airplane turning toward A—T, the motor 112 will reverse, causing reversing of the shaft 99, provided that the speeds of the motors and their gear ratios are suitably chosen. Therefore now, the airplane is turning in opposite sense, but at a slow rate of turn. The more nearly the ship approaches the line AT, the smaller will be the angular displacement of the two loops which means that shaft 48 gradually approaches its neutral position, while at the same time, the rate of turn of motor 112 also decreases due to the weakening of the magnetic clutch 104. Similarly, motor 92 rotates also slower so that the plane approaches the line AT at a continuously decreasing speed. As soon as this line is reached, both motors will stop rotating because shaft 48 has arrived at its starting position thereby interrupting the current supply to clutch 104. The ratio of speed of motor 112 with respect to motor 92 can be easily adjusted by rheostat 106, which controls the torque of clutch 104 independently from rheostats 83 and 84. If the heading of the plane is not yet correct with respect to the cross wind W, a few oscillations around the line AT may occur before the ship finally settles on the line AT, proceeding towards T, but headed at an angle thereto due to the cross wind. Inasmuch as the carbon piles 110 and 111 do not give perfect speed control of the motor 112 to make same run proportional to the rate of turn of shaft 48, it will be necessary to experimentally adjust the rheostat 106 until asymptotic approach of the plane to the line AT is secured.

The assumption has been, with the foregoing procedure, that the signals transmitted from both loops I and II to amplifier 29 are exactly alike in their amplitude. However, in order to cause the airplane to return to the straight ground track A—T at a quicker rate, I prefer to decrease the signal from loop II by means of potentiometer 24 or by a gain control in receiver 23 in such a way as to be able to compensate for the strength of the cross wind W. If it is assumed that by means of potentiometer 24 the signal in the receiver 23 be decreased to 50% of the signal strength of loop I under the same conditions, then loop II will have to turn through twice the angle as before to compensate for the signal received in loop I, as illustrated in Fig. 2, position B. Therefore the plane obviously now will turn towards AT much more rapidly, whereby a much faster approach of the airplane to the line A—T is secured. Evidently, by setting the potentiometer 24 to the estimated strength of the cross wind, it is possible to obtain conditions whereby, regardless of the strength of the wind, the same rate of return to the straight line ground track can be obtained.

Fig. 3 illustrates the effect of decreasing the signal from loop II. The plane, which starts from position D and proceeds to position E along the broken line DE, has done so with equal signals from loops I and II. It would have reached the straight ground track at position F if the potentiometer 24 would have been adjusted to substantially decrease the signal from loop II.

The steering devices shown in Fig. 1 and Fig. 4 both work on the same general principle, namely to create a mechanical displacement proportional to the angle in space between the straight ground track and a straight line from the ship to the transmitting station, and to actually measure this displacement directly as the motion of shaft 48.

Fig. 5 shows another preferred form of this invention, in which only one loop is employed to measure a similar angular displacement in space, but in this modification, electrical means are used to obtain the mechanical displacement. Obviously, the purpose of loop II is only to obtain mechanical means for measuring an angle proportional to the angle between the axis of loop I and the line AT, and to provide means for adapting the mechanical value of this angle to the strength of the cross wind. Actually, the signal amplitude in loop I alone must also be proportional to the sine of this angle, or approximately proportional to the angle itself for small deviations. If it is, therefore, possible to convert this signal into measurable angular motion of a shaft, proportional to the signal, results equal to those obtained with two loops, should be obtainable.

In Fig. 5, the apparatus necessary to stabilize loop I' has been mounted in a box 120, from which shaft 1 projects to carry the loop. The stabilizing devices are identical with those described for Fig. 1. The loop receiver 121 is identical with amplifier 35. The output of the receiver, which controls the zero center meter 25', is led to a switch 122 and from there to a constant impedance non-reacting net work 123, consisting of a bridge containing the resistors 124, 125, 126, 127. The reversing potential, the amplitude of which is proportional to the signal, is fed into the bridge at 128 and 129, so that from points 131 and 129 a signal is obtained for an amplifier 132 adapted to control a reversible motor 133.

As long as meter 25' stands at zero value, no signal is present across resistor 126, and motor 133 stands still. If a loop signal is received, the potential appearing across resistor 126 will cause motor 133 to run in a direction controlled by the phase or sign of this potential, and with a speed according to its amplitude.

Motor 133 drives a screw shaft 134 adapted to move a nut 135 along its axis, thereby moving two insulated sliders 136 and 137 over the contact surfaces of two rheostats 138 and 139 respectively. These resistors are connected in parallel to potentiometer 141' which is, in turn, connected to battery 140', the connections being such as to apply potentials of opposite polarity to corresponding ends of the two resistors. The adjustment of potentiometer 141' determines the voltage applied across the resistors. It is evident, that only when both sliders are at the center of the resistors, will there be zero potential between the sliders. Moving the nut 135 one way or the other from this zero position will cause voltages of opposite sign to appear between the sliders, and proportional in amplitude to the distance the sliders have moved from the neutral position. The sliders are connected to the junctions 130 and 131 of the bridge 123, and the potential between the sliders causes a second signal to appear across resistor 126, but the arrangement of the bridge and the direction of rotation of motor 133 is such that the second signal opposes the first one, and the motor will therefore continue to run until the original signal across resistor 126 is fully balanced out. The potential from the sliders cannot react into the receiver 121, as junctions 128 and 129 are of equal potential with respect to junctions 130 and 131, and the output from the receiver cannot feed into the resistors 138 and 139 for similar reasons. Both the receiver and the potential from the sliders therefore feed into constant impedances, which is of importtance, if the motor 133 is supposed to represent in its total revolutions the signal received in the loop.

Motor 133 also drives a worm 140 to turn worm gear 141 mounted on shaft 48, the angular motion of which is now a mechanical equivalent of the loop signal or the angle between the axis of the stabilized loop and the line AT in Fig. 2.

Shaft 48 is the same angular difference shaft employed in Fig. 1 and Fig. 4, and the apparatus shown as operated from this shaft may be considered as identical with the equipment shown in Fig. 1 or Fig. 4.

The potentiometer 141' allows control of the potential applied across resistors 138 and 139. If the potentiometer is adjusted to apply the highest obtainable voltage to the resistors, a comparatively small shift of the nut 135 will suffice to balance out the loop signal, and the angular motion of shaft 48 is small. The more the potential to the resistors 138 and 139 is decreased by potentiometer 141', the further will nut 135 have to be moved to balance the same loop signal, and the larger is the angular motion of shaft 48, thereby causing a faster turn of the airplane.

If it is desired to obtain the actual drift angles in compass degrees, as caused by the side wind, the shaft 22 of loop II or the input shaft 99 to the gyro-pilot may be connected by bevel gears 76 and 77 to a dial 78 which can be initially set to zero by means of differential 79 and handwheel 80' as shown in Fig. 1. In a similar way, a second dial 81' may be provided, which is set by handwheel 82' to the original reading of the directional gyroscope 16. At the time the ship has reached the straight ground track, the angular indication of dial 78 will show the drift angle direct against a zero mark 83' fixed to the framework carrying the dial, or if the dial 78 was in the beginning set to the same reading as the dial 81', it will show the deviation of the heading of the ship from the course in compass degrees.

The switches 36, 27, and 122 provide convenient means of enabling the pilot to use either loop I or loop II independently and separately from each other if he so desires. In other words, no separate installation of loops for this purpose is required, but it is understood, that only one receiver may be used with both loops, if the signals are combined at the input to that receiver.

It will be understood that the action of this apparatus will start immediately as soon as a perceptible signal is received by the loops, so that the exaggerated conditions shown in Figs. 2 and 3 in practice never will occur. All the actions described separately as distinct steps actually occur simultaneously and will result in a gradual turning of the ship while flying very close to the straight ground track until it has reached a position where its heading is just compensating for the cross wind encountered. This device also may be used to fly to a transmitter which may be located at any angle to the momentary course. As soon as both loops have been turned and tuned to that station, and switches 36 and 27 closed, the ship will follow a straight line from the point at which the switches were closed to the transmitter automatically.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a system for automatic steering of a drifting craft along the straight ground track toward a radio transmitting station, means for determining the angle between said track and the heading of said craft including two directional antennae tuned to the carrier frequency of said transmitting station, means for combining the outputs of said antennae, means for positioning one of said antennae in azimuth, gyroscopic means for maintaining the same at a fixed azimuth angle, means for rotating the other antenna in accordance with said combined output, means for generating a signal proportional to the difference in angular position of said two antennae, means for generating a signal proportional to the rate of change thereof, means for combining said two signals, a gyro pilot for maintaining the craft on a set course including course setting means, and means for controlling said course setting means in accordance with said combined signal.

2. In a system for automatic steering of a drifting craft along the straight ground track toward a radio transmitting station, means for determining the angle between said track and the heading of said craft including a directional antenna tuned to the carrier frequency of said transmitting station, and gyroscopic means for stabilizing said antenna in azimuth, means for determining the angle between said heading and a straight line from said craft to said station, including a second similarly tuned directional antenna, reversible motive means for continuously in keeping said antenna in a predetermined angular relationship with respect to said station, means associated with said antenna for receiving and combining the outputs therefrom due to radio signals from said station and for controlling said motive means in accordance with said combined output, means for continuously generating a signal proportional to the difference between said angles and to its rate of change, an automatic pilot including reversible power means for changing the course of said craft and means responsive to both the magnitude and the rate of change of said angular difference for controlling said automatic pilot.

3. In a system for automatic steering to prevent drifting of an automatic pilot controlled craft from the straight ground track towards a radio transmitting station, an automatic pilot having course setting means, a radio direction finder loop for receiving signals radiated by said station and tuned to the carrier frequency thereof, means for initially setting said loop on said station, means for gyroscopically stabilizing said loop in azimuth in said set position, and means for maintaining the heading of the craft in fixed relationship to the position of said loop comprising means for generating a signal proportional to the output of the loop, means for generating a signal proportional to the rate of change thereof, means for combining said two signals and means for controlling the course setting means of the automatic pilot in accordance with said combined signal.

4. In a system for automatic steering to prevent drifting of an automatic pilot controlled craft from the straight ground track towards a radio transmitting station, a pair of directional radio loop antennae tuned to the carrier frequency of said transmitting station for receiving signals radiated by said station, means for stabilizing one only of said loops in azimuth in a position parallel to said ground track, means for combining the outputs of said two loop antennae, an amplifier for receiving said combined outputs, reversible motive means actuated in accordance with the output thereof to turn the second loop to a position where the sum of said signals is zero, means actuated by said motive means for determining the relative angular deflection between said two loops and its rate of change, an automatic pilot, and means including said automatic pilot for turning said craft in accordance with the combination of said deflection and rate until both remain zero, whereby said plane is returned to and maintained on said straight ground track.

5. In a system for automatic steering of a drifting craft along the straight ground track toward a radio transmitting station, means for receiving radio signals radiated by said station and delivering an output proportional to the angle between said track and a straight line from said craft to said station, comprising at least one radio direction finder loop and receiver therefor, and means for stabilizing said loop in azimuth with its axis parallel to said track, motive means controlled by said signal for causing angular motion of a second loop in accordance with said signal, an automatic pilot including course setting means, means for controlling said course setting means in accordance with the angular position of said second loop and with the rate of change thereof, means for obtaining signals proportional to said motion and its rate of change, and means for turning said craft automatically in accordance with the sum of said signals until both said signals remain zero, whereby said craft is returned to said track asymptotically and maintained thereon at a heading to compensate for said drifting.

6. In a system for automatic steering of a craft as claimed in claim 5, means for varying the amount of said angular motion according to the amount of drift.

7. In a system for automatic steering of a drifting craft along the straight ground track toward a point from which radio signals are emitted, means for measuring the angle between said ground track and the direction from which said signals are received while said craft drifts, including a member stabilized in azimuth parallel to said track and supporting a loop antenna tuned to the carrier frequency of said radio signals, a radio receiver receiving the output of said loop, a second loop similarly tuned, a non-directional antenna cooperating therewith, a second radio receiver receiving the combined outputs of said second loop and non-directional antenna, means for combining the output of said two receivers, means for orienting said second loop in accordance with said combined outputs, means for generating a mechanical signal proportional to said combined receiver output, a gyro pilot, and means responsive to said mechanical signal for actuating the course setting means of said gyro pilot to control the heading of the craft thereby.

8. In a steering system for aircraft controlled by an automatic pilot, means for preventing drifting from a course set toward a radio transmitting station comprising a pair of directional antennae tuned for receiving signals radiated by said station, means for stabilizing one of said antennae in azimuth, means for combining the output of said two antennae in phase opposition, an amplifier receiving the combined output thereof, driving means actuated by the output of said amplifier for positioning the second antenna in azimuth, means for providing a signal proportional to the relative angular displacement of said two antennae and means actuated by said signal for causing the automatic pilot to turn the craft at a rate proportional to the signal toward the straight line track to the transmitting station.

9. In a steering system for aircraft controlled by an automatic pilot, means for preventing drifting from a course set toward a radio transmitting station comprising a pair of directional antennae tuned for receiving signals radiated by said station, means for stabilizing one of said antennae in azimuth, means for combining the outputs of said two antennae, an amplifier-rectifier receiving the combined output thereof, driving means actuated by the output of said amplifier for positioning the said other antenna in azimuth, means for providing a signal proportional to the relative angular displacement of said two antennae and to the rate of change of said displacement, and means actuated by said signal for causing the automatic pilot to turn the craft at a rate proportional to said signal toward the straight line track to said transmitting station.

10. In an automatic steering device to prevent drifting of a gyro pilot controlled airplane from the straight ground track toward a radio transmitting station, a loop antenna for receiving signals radiated from said station tuned to the carrier frequency thereof, means for setting said loop is azimuth, means for maintaining said loop at a fixed azimuth setting, a receiver for said loop, rectifier means for converting the A. C. output of said receiver into reversing D. C. potentials, a motor operated in accordance with said potentials, a second loop forming with a non-directional antenna a receiving system of unsymmetrical characteristics positioned in azimuth by said motor, means for applying the output of said unsymmetrical receiving system to said receiver in combination with the output of said first loop, whereby the second loop is so positioned that the combined receiver input is zero, and means for altering the course set by said gyro pilot at a rate proportional to the difference of the azimuth angles of said two loops.

11. An automatic steering system in accordance with claim 10, having means for varying the proportion of the total output of the said second loop applied to said receiver.

12. In a system for steering a drifting dirigible craft toward a radio transmitter, a loop antenna tuned to the carrier frequency of said transmitter, means for setting said loop in azimuth, gyroscopic means for maintaining the same at a set azimuth angle, a receiver connected thereto including rectifying means for generating a D. C. signal proportional to the radio signal, a motor actuated by said D. C. signal, electrical repeat-back means actuated thereby for generating a D. C. potential proportional to the angular displacement of said motor, means for causing said last D. C. potential to annual said first D. C. signal, and means for controlling the steering of said craft in response to the angular displacement of said motor and a time integral of said displacement.

13. The method of automatically steering a drifting craft along a straight ground track toward a fixed point comprising the steps of deriving a signal as a function of the angle between said track and the line between said craft and said point, deriving a signal in accordance with the rate of change of said first signal, and controlling the heading of said craft jointly by said two signals.

14. The method of automatically steering a drifting craft along a straight ground track toward a fixed point, comprising the steps of deriving a signal as a function of the angle between said track and the line between said craft and said point, deriving a signal in accordance with the rate of change of said first signal, and controlling the rate of turn of said craft jointly by said two signals.

15. The method of automatically steering a drifting craft along a straight ground track toward a radio transmitting station, comprising the steps of deriving a signal as a function of the angle between said track and the line between said craft and said station, deriving a signal in accordance with the rate of change of said first signal, combining said two signals, integrating said combined signals, and controlling the heading of said craft by said integrated signal.

16. In a system for automatically steering a drifting craft along a straight ground track toward a fixed point, the combination comprising means for obtaining a signal corresponding to the angle between said track and the line between said craft and said point, and means for controlling the heading of said craft in accordance with said signal and the time rate of change of said signal.

17. In a system for automatically steering a drifting craft along a straight ground track toward a fixed point, the combination comprising means for positioning a first member as a function of the angle between said track and the line from said craft to said point, means for positioning a second member in accordance with the time rate of change of said angle, means for combining the motions of said two members, means for integrating said combined motion with respect to time, and means for controlling the heading of said craft by said integrated motion.

18. In a system for automatic steering to prevent drift of a craft from the straight ground track toward a radio transmitting station, the combination including directional antenna means for receiving radio signals radiated from said station, means for fixedly positioning said antenna means in azimuth, and means tending to maintain a predetermined heading of said craft comprising means for producing a first signal from the output of said antenna means, means for producing a second signal corresponding to the rate of change of said first signal, and means for controlling the heading of said craft by said two signals.

19. In a system for automatic steering of a drifting craft along a straight ground track toward a radio transmitting station, the combination comprising two directional antennae adapted to receive radio signals radiated from said station, means for fixedly positioning one of said antennae in azimuth, means for rotating the other of said antennae until both antennae are oriented in predetermined relation to the line from said craft to said station, and means responsive to the angle between said antennae for controlling the heading of said craft.

20. In a system for automatic steering of a drifting craft along the straight ground track toward a radio transmitting station, the combination including two antennae adapted to receive radio signals radiated from the same vicinity, at least one of which antennae is directive, means for combining the outputs of said antennae, means for fixedly positioning said directive antenna in azimuth, means for positioning the other antenna in accordance with said combined outputs, means for producing a signal proportional to the difference in angular position of said two antennae, and means for controlling the heading of said craft by said signal.

21. In a system for automatic steering as in claim 20, further including means for adjusting the magnitude of the output of one of said antennae.

22. In a system for automatic steering of a drifting craft along the straight ground track toward a radio transmitting station, the combination including two directional antenna means for receiving radio waves radiated by said station, means for fixedly positioning one of said antenna means in azimuth, means for combining the outputs of said antenna means, means for positioning the other antenna means in accordance with said combined output, means for producing a signal proportional to the difference in angular position of said two antenna means, and means for controlling the heading of said craft in accordance with said signal and a time integral thereof.

23. In a system for automatic steering of a drifting craft along the straight ground track toward a radio transmitting station, the combination including a directional antenna adapted to receive waves radiated by said station, means for stabilizing said antenna in azimuth, a second directional antenna also adapted to receive said waves, motive means for continuously keeping said second antenna in predetermined angular relationship with respect to a straight line from said craft to said station, means for combining the outputs from said antennae and for controlling said motive means in accordance with said combined output, means for continuously producing a signal corresponding to the angle between said antennae and to the rate of change of said angle, means for changing the course of said craft, and means responsive to said signal for controlling said course changing means.

24. In a system for steering a drifting dirigible craft toward a radio transmitter, directional antenna means for receiving waves radiated from said transmitter, means for maintaining said antenna means at a set azimuth angle, means for producing a signal from the output of said antenna means, a motor actuated by said signal, electrical repeat-back means actuated by said motor for generating a potential proportional to the angular displacement of said motor, means for causing said potential to annul said signal, and means for controlling the steering of said craft in response to the angular displacement of said motor and a time integral of said displacement.

25. Apparatus adapted for use on a navigable vehicle, comprising a directional radio antenna orientable relative to a radio transmitter disposed along a predetermined course to be followed by said vehicle, a radio receiver energized by said antenna for producing responses as a function of the degree of orientation of said antenna relative to said transmitter, a second radio receiver responsive to lateral deviation of said vehicle from said course, adjustable automatic pilot means for maintaining said vehicle upon a predetermined heading, and means actuated by the responses from said receivers for adjusting said heading so as to direct said vehicle toward said course.

26. Apparatus adapted for use on a navigable vehicle, comprising a directional radio antenna orientable relative to a radio transmitter disposed along a predetermined course to be followed by said vehicle, a radio receiver energized by said antenna for producing responses varying with the degree of orientation of said antenna relative to said transmitter, a second radio receiver responsive to lateral deviation of said vehicle from said course, adjustable automatic pilot means for maintaining said vehicle upon a predetermined heading, a heading adjuster on said pilot, and adjuster-controlling means including motive means continuously operative in accordance with the responses from said receivers to vary said heading continuously toward said course as long as said vehicle is in a deviated position.

27. Apparatus adapted for use on a navigable vehicle, comprising a directional radio antenna orientable relative to a radio transmitter disposed along a predetermined course to be followed by said vehicle, a first radio receiver energized by said antenna for producing responses varying with the degree of orientation of said antenna relative to said transmitter, a second radio receiver responsive to lateral deviation of said vehicle from said course, and operative on said directional antenna to rotate said directional antenna relative to said transmitter and to said vehicle in accordance with the extent of said lateral deviation, adjustable pilot means for directing said vehicle upon a predetermined heading, and direction-con-controlling means for adjusting the heading adjustment of said pilot means in accordance with the responses from said first receiver.

BRUNO A. WITTKUHNS.